(12) United States Patent
Horii et al.

(10) Patent No.: US 11,489,391 B2
(45) Date of Patent: Nov. 1, 2022

(54) STATOR, MOTOR, AND BLOWING DEVICE

(71) Applicant: Nidec Corporation, Kyoto (JP)

(72) Inventors: Yuya Horii, Kyoto (JP); Tsuyoshi Yasumura, Kyoto (JP); Kohei Kurazono, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 216 days.

(21) Appl. No.: 16/668,101

(22) Filed: Oct. 30, 2019

(65) Prior Publication Data

US 2020/0161926 A1 May 21, 2020

(30) Foreign Application Priority Data

Nov. 20, 2018 (JP) .............................. JP2018-217502

(51) Int. Cl.
*H02K 3/34* (2006.01)
*H02K 3/38* (2006.01)
(Continued)

(52) U.S. Cl.
CPC ............... *H02K 3/345* (2013.01); *H02K 3/28* (2013.01); *H02K 3/34* (2013.01); *H02K 3/38* (2013.01);
(Continued)

(58) Field of Classification Search
CPC .......... H02K 3/34; H02K 1/187; H02K 3/345; H02K 3/487; H02K 3/493; H02K 3/50;
(Continued)

(56) References Cited

U.S. PATENT DOCUMENTS 4,934,041 A * 6/1990 Hoover .................. H02K 29/08
29/596
10,090,724 B2 10/2018 Cheng et al.
(Continued)

FOREIGN PATENT DOCUMENTS

| CN | 106849447 A | 6/2017 | |
| DE | 20321493 U1 * | 9/2007 | ............. H02K 1/187 |
| JP | 09-182344 A | 7/1997 | |
| JP | 2008-061391 A | 3/2008 | |

OTHER PUBLICATIONS

EBM Papst, External Rotor Motor in Particular Small or Micro Fan, Sep. 20, 2007, DE 20321493 (English Machine Translation) (Year: 2007).*

*Primary Examiner* — Alexander A Singh
(74) *Attorney, Agent, or Firm* — Keating & Bennett

(57) ABSTRACT

A stator for use in a motor includes a stator core, an insulator, a coil, and a terminal pin. The stator core includes a core back having an annular shape and teeth. The insulator covers at least a portion of the stator core. The coil is defined by a conductive wire wound around the teeth via the insulator. The terminal pin extends axially upward from an upper surface of the insulator and is connected to an end portion of the conductive wire. The insulator includes an annular portion, first protruding portions, and second protruding portions. The annular portion covers at least a portion of the core back and is centered on the central axis. The plurality of first protruding portions cover at least a portion of each of the teeth and protrude radially outward from the annular portion.

9 Claims, 8 Drawing Sheets

(51) Int. Cl.
  *H02K 3/52* (2006.01)
  *H02K 15/095* (2006.01)
  *H02K 3/28* (2006.01)
  *H02K 7/14* (2006.01)
  *H02K 21/22* (2006.01)

(52) U.S. Cl.
  CPC ........... *H02K 3/522* (2013.01); *H02K 15/095* (2013.01); *H02K 7/14* (2013.01); *H02K 21/22* (2013.01); *H02K 2203/03* (2013.01)

(58) Field of Classification Search
  CPC ........ H02K 1/2786; H02K 3/38; H02K 21/22; H02K 7/14; H02K 3/522; H02K 15/095; H02K 3/28; H02K 2203/03; H02K 1/146; H02K 21/222; H02K 1/14; H02K 11/33
  USPC .................................................. 310/214, 215
  See application file for complete search history.

(56) References Cited

U.S. PATENT DOCUMENTS

| | | | |
|---|---|---|---|
| 2006/0043802 A1* | 3/2006 | Sugiyama | H02K 29/08 310/67 R |
| 2007/0231163 A1* | 10/2007 | Liu | F04D 25/0613 417/354 |
| 2008/0054735 A1 | 3/2008 | Yoshida et al. | |
| 2008/0079325 A1* | 4/2008 | Yamada | F04D 25/0633 310/67 R |
| 2009/0285699 A1* | 11/2009 | Muraoka | F04D 25/0633 417/354 |
| 2013/0313922 A1* | 11/2013 | Kim | H02K 1/12 310/44 |
| 2014/0333165 A1* | 11/2014 | Hikita | H02K 3/522 310/71 |
| 2018/0219460 A1* | 8/2018 | Shiozawa | H02K 5/225 |

* cited by examiner

STATOR, MOTOR, AND BLOWING DEVICE

CROSS REFERENCE TO RELATED APPLICATION

The present invention claims priority under 35 U.S.C. § 119 to Japanese Application No. 2018-217502 filed on Nov. 20, 2018, the entire contents of which are hereby incorporated by reference.

FIELD OF THE INVENTION

The present invention relates to a stator, a motor, and a blowing device.

BACKGROUND

In the pull-out structure of the coil end portion in the conventional brushless motor, a cylindrical coil guide is provided which abuts on a boss part of an insulating plate provided on both axial end portions of a stator in a state where a tip portion is just internally fitted to a coil insertion hole formed in a wiring board. The coil end portion is pulled out to the outer surface side of the wiring board in the state of being supported by the coil guide in a penetrating manner.

In the conventional configuration, the coil guide is provided only at a position where the coil end portion is pulled out. For example, when the number of teeth configuring the coil in the stator is larger than the number of pulling out the coil end portion, there is provided the teeth in which the coil guides are arranged on both sides in the circumferential direction and the teeth in which the coil guide is arranged only on one side in the circumferential direction. In the teeth in which the coil guide is provided only on one side in the circumferential direction, the left and right shapes in the circumferential direction of the teeth are asymmetric. For this reason, when a conductive wire is wound around the teeth via the insulating plate to form a coil, the conductive wire may be wound unbalanced on the left and right in the circumferential direction of the teeth. If the conductive wire configuring the coil is wound unbalanced, characteristics such as resistance and inductance may become unstable.

SUMMARY

An example embodiment of a stator of the present invention is a stator used in a motor and includes a stator core, an insulator, a coil, and a terminal pin. The stator core includes a core back having an annular shape and surrounding a central axis that extends vertically, and a plurality of teeth extending radially outward from the core back. The insulator covers at least a portion of the stator core. The coil is defined by a conductive wire wound around the teeth via the insulator. The terminal pin extends axially upward from an upper surface of the insulator and is connected to an end portion of the conductive wire. The insulator includes an annular portion, a plurality of first protruding portions, and a plurality of second protruding portions. The annular portion covers at least a portion of the core back and is centered on the central axis. The plurality of first protruding portions cover at least a portion of each of the teeth and protrude radially outward from the annular portion. The plurality of second protruding portions are provided in respective spaces between the first protruding portions adjacent in a circumferential direction and protrude radially outward from the annular portion to be smaller than the first protruding portions. The terminal pin is provided in a portion of the plurality of second protruding portions. In at least a portion of a radially inner end of the coil, the terminal pin is provided in a portion of two of the second protruding portions adjacent via the first protruding portion in plan view from the axial direction.

An example embodiment of a motor of the present invention includes the stator and a rotor including a magnet opposing the stator in a radial direction.

An example embodiment of a blowing device of the present invention includes the motor and an impeller rotating with the rotor.

The above and other elements, features, steps, characteristics and advantages of the present disclosure will become more apparent from the following detailed description of the example embodiments with reference to the attached drawings.

DETAILED DESCRIPTION

Figure 2:
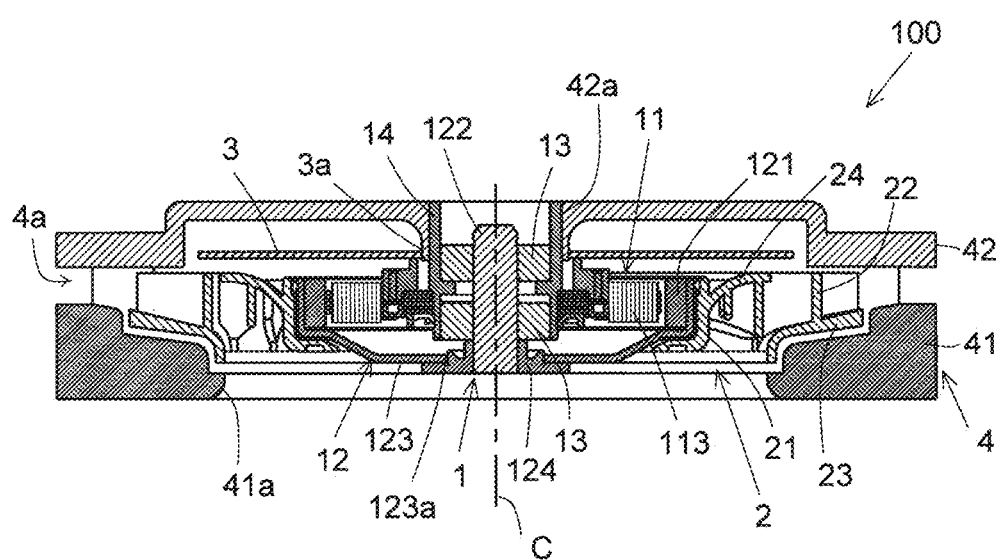
FIG. 2 is a vertical sectional view of a blowing device according to an example embodiment of the present invention.

Hereinafter, example embodiments of the present invention will be described in detail with reference to the drawings. Note that, in this specification, a direction parallel to a central axis C of a motor 1 of a blowing device 100 illustrated in FIG. 2 is referred to as an "axial direction", a direction perpendicular to the central axis C is referred to as a "radial direction", and a direction along a circular arc centered on the central axis C is referred as "circumferential direction". In addition, in this specification, the shape and positional relationship of each part will be described with the axial direction as a vertical direction and the side of which an impeller 2 is provided with a circuit board 3 as a top. However, this definition of the vertical direction is not intended to limit directions when a stator 11, a motor 1, and a blowing device 100 according to the present invention are used.

Figure 1:
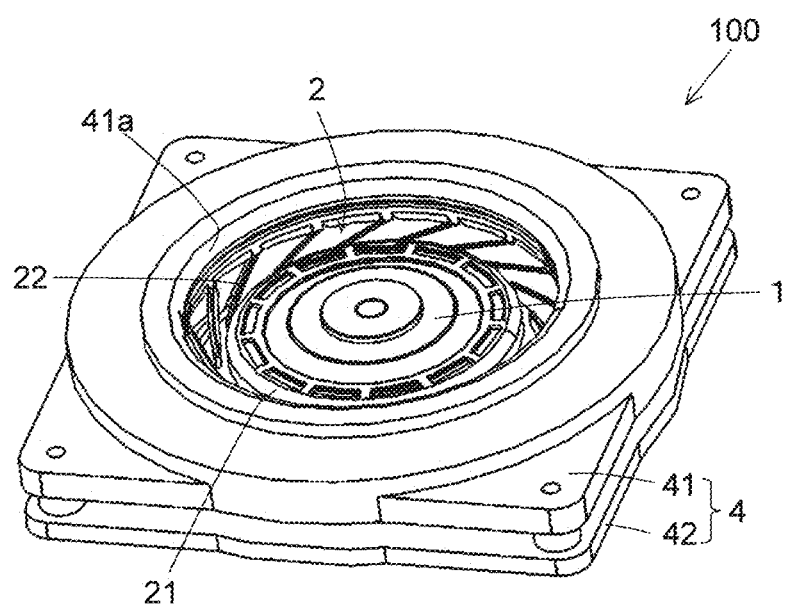
FIG. 1 is a perspective view of a blowing device according to an example embodiment of the present invention.

FIG. 1 is a perspective view of the blowing device 100 according to an example embodiment of the present invention. FIG. 1 is a view of the blowing device 100 as viewed obliquely from below. FIG. 2 is a vertical sectional view of the blowing device 100 according to the example embodiment of the present invention. The blowing device 100 is a centrifugal fan. As illustrated in FIGS. 1 and 2, the blowing device 100 includes the motor 1 and the impeller 2. The blowing device 100 further includes a circuit board 3 and a casing 4.

The motor 1 is an outer rotor type motor. As illustrated in FIG. 2, the motor 1 includes the stator 11 and a rotor 12. The motor 1 further includes a bearing 13 and a bearing holder 14. The stator 11 is an armature that has a plurality of coils 113 and generates a magnetic flux according to a drive current flowing through the coils 113. The stator 11 has an annular shape centered on the central axis C extending vertically. The details of the stator 11 will be described later.

The rotor 12 rotates about the central axis C. The rotor 12 includes a magnet 121 that faces the stator 11 in the radial direction. In detail, the magnet 121 is arranged radially outward of the stator 11. In this example embodiment, the magnet 121 has a circular shape centered on the central axis C. However, the magnet 121 may be configured by a plurality of magnet pieces arranged in the circumferential direction.

The rotor 12 further includes a shaft 122, a rotor holder 123, and a bush 124. The shaft 122 is a columnar member centered on the central axis C and extending in the axial direction. The rotor holder 123 is a bottomed cylindrical member having an opening on the upper surface and extending in the axial direction. The magnet 121 is fixed to the inner peripheral surface of the rotor holder 123. For example, an adhesive is used to fix the magnet 121 to the rotor holder 123. The rotor holder 123 includes a holder opening 123a penetrating in the axial direction on the bottom wall. The holder opening 123a is centered on the central axis C. The bush 124 is fixed to the lower end portion of the shaft 122. The bush 124 is fitted into the holder opening 123a and is fixed to the rotor holder 123. That is, when the shaft 122 rotates, the rotor holder 123 also rotates.

The bearing 13 is arranged radially outward of the shaft 122 and supports the shaft 122 in a rotatable manner. In this example embodiment, the bearing 13 is a ball bearing. The number of the bearings 13 is two, and the two bearings 13 are arranged at intervals in the axial direction. The type and number of bearings 13 may be changed. The bearing 13 may be a sleeve bearing or the like, for example.

The bearing holder 14 has a cylindrical shape extending in the axial direction. The bearing holder 14 is arranged radially outward of the bearing 13 and holds the bearing 13. In this example embodiment, the bearing holder 14 holds the two bearings 13. The bearing holder 14 is arranged radially inward of the stator 11 and is fixed to the stator 11. The bearing holder 14 is fixed to the stator 11 by, for example, an adhesive or press-fitting.

In the motor 1, when a drive current is supplied to the stator 11, rotational torque is generated between the magnet 121 and the stator 11. Accordingly, the rotor 12 rotates with respect to the stator 11. In this example embodiment, the quality stability of the stator 11 can be improved, and thus the quality stability of the motor 1 can be improved.

The impeller 2 rotates with the rotor 12. As illustrated in FIGS. 1 and 2, the impeller 2 includes a boss part 21, a plurality of blade parts 22, a lower shroud 23, and an upper shroud 24. In this example embodiment, the boss part 21, the plurality of blade parts 22, the lower shroud 23, and the upper shroud 24 are a single member. However, at least one of these members 21 to 24 may be a separate member.

The boss part 21 has a cylindrical shape extending in the axial direction. The boss part 21 is arranged radially outward of the rotor holder 123 and is fixed to the outer peripheral surface of the rotor holder 123. The boss part 21 is fixed to the rotor holder 123 by, for example, press fitting or adhesion. Specifically, the boss part 21 has a circular protruding part protruding radially inward at the lower end in the axial direction. The protruding part may not be provided. For example, a weight member that performs balance adjustment can be arranged on the protruding part.

The blade part 22 is arranged radially outward of the boss part 21 and extends in a direction away from the central axis C. The plurality of blade parts 22 are arranged at intervals in the circumferential direction. Specifically, the blade part 22 faces the boss part 21 through a gap in the radial direction. However, the blade part 22 may be connected to the boss part 21.

The lower shroud 23 has an annular shape centered on the central axis C. The lower shroud 23 is arranged radially outward from the boss part 21 rather than the radially inner end of the blade part 22. The upper surface of the lower shroud 23 is connected to the radially outer lower surface of each blade part 22. That is, the lower shroud 23 is connected to a radially outer portion of the plurality of blade parts 22.

The upper shroud 24 has an annular shape centered on the central axis C. The radially inner end of the upper shroud 24 is connected to the outer peripheral surface of the boss part 21. The radially inner upper surface of each blade part 22 is connected to the lower surface of the upper shroud 24. That is, the upper shroud 24 is connected to a radially inner portion of the plurality of blade parts 22. The plurality of blade parts 22 are connected to the lower shroud 23 and the upper shroud 24.

The circuit board 3 is arranged above the stator 11 in the axial direction and is supported by the stator 11. The circuit board 3 is electrically connected to the stator 11. Specifically, an electric circuit for supplying a drive current to the coil 113 is formed on the circuit board 3. The circuit board 3 has a board hole 3a penetrating in the axial direction at the central portion. The bearing holder 14 is arranged radially inward of the board hole 3a. The bearing holder 14 is passed through the board hole 3a.

The casing 4 accommodates the motor 1, an impeller 2, and the circuit board 3. As illustrated in FIGS. 1 and 2, the casing 4 includes a lower casing 41 and an upper casing 42.

The lower casing 41 is arranged below the impeller 2 in the axial direction. The lower casing 41 has an intake port 41a penetrating in the axial direction at the central portion. In plan view from below in the axial direction, a portion of the motor 1 and the impeller 2 is exposed to the outside through the intake port 41a. Specifically, the lower casing 41 has a cylindrical shape with an outer rectangular shape in which four corners are combined on the outer periphery of a cylindrical portion extending in the axial direction. The intake port 41a is circular. However, the lower casing 41 may have another shape such as a cylindrical shape. The shape of the intake port 41a may be other than a circular shape. By providing the lower casing 41, the occurrence of turbulent flow around the lower shroud 23 can be suppressed, and the blowing device 100 can efficiently send out air in the centrifugal direction.

The upper casing 42 is arranged above the impeller 2 in the axial direction. The upper casing 42 has a rectangular shape in plan view from the axial direction and has approximately the same size as the lower casing 41. In plan view from the axial direction, the four corners of the lower casing 41 and the four corners of the upper casing 42 overlap. In this example embodiment, the lower casing 41 and the upper casing 42 are fixed by screws arranged at four corners. In the central portion of the upper casing 42, an upper casing hole 42a penetrating in the axial direction is provided. The axial upper portion of the bearing holder 14 is inserted into the upper casing hole 42a. The bearing holder 14 is fixed to the upper casing 42.

In the blowing device 100, air is sucked from the intake port 41a of the lower casing 41 by the rotation of the impeller 2. The air sucked from the intake port 41a is turned inside the casing 4 in the circumferential direction by the rotation of the impeller 2 and then is discharged from an exhaust port 4a provided in an axial space between the lower casing 41 and the upper casing 42. The lower shroud 23 and the upper shroud 24 efficiently guide the air drawn from the intake port 41a into the casing 4 to the exhaust port 4a, thereby improving the blowing efficiency of the blowing device 100. In this example embodiment, the exhaust port 4a is provided in the entire circumferential area of the casing 4. However, the exhaust port 4a may be provided only in a circumferential portion of the casing 4. In this example embodiment, the quality stability of the motor 1 can be improved, and thus the quality stability of the blowing device 100 can be improved.

Figure 3:
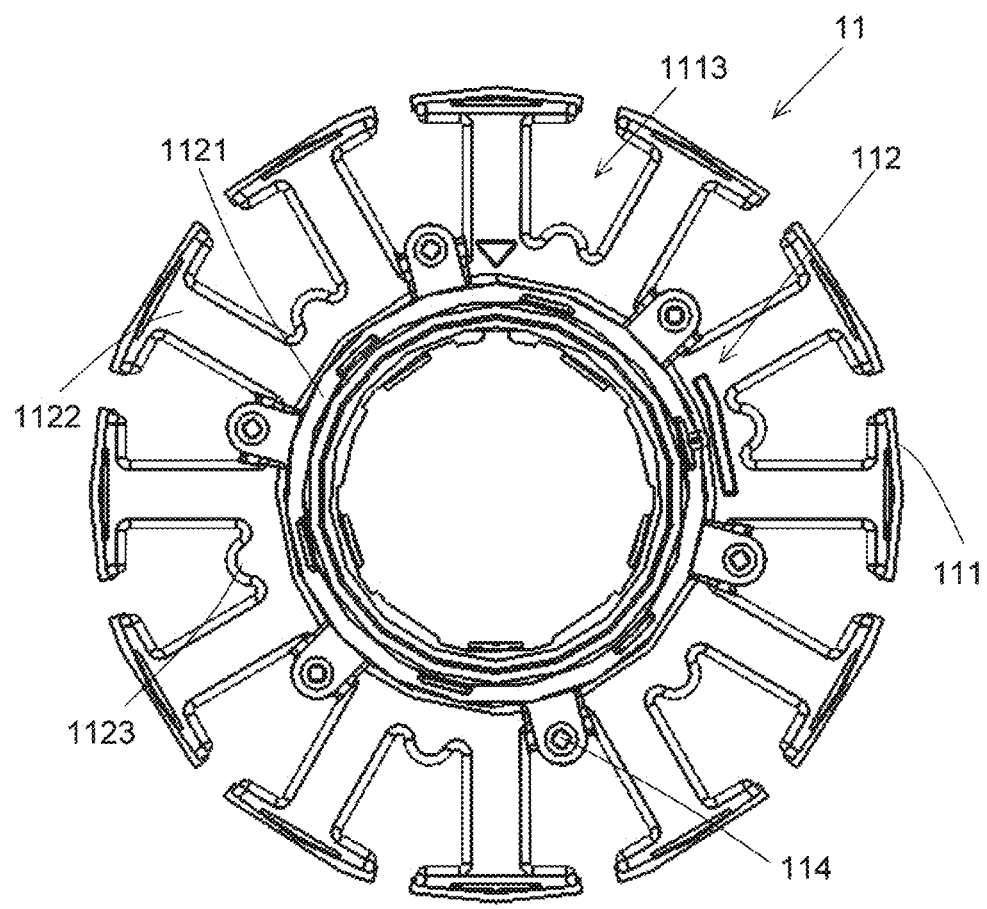
FIG. 3 is a plan view of a stator according to an example embodiment of the present invention.
Figure 4:
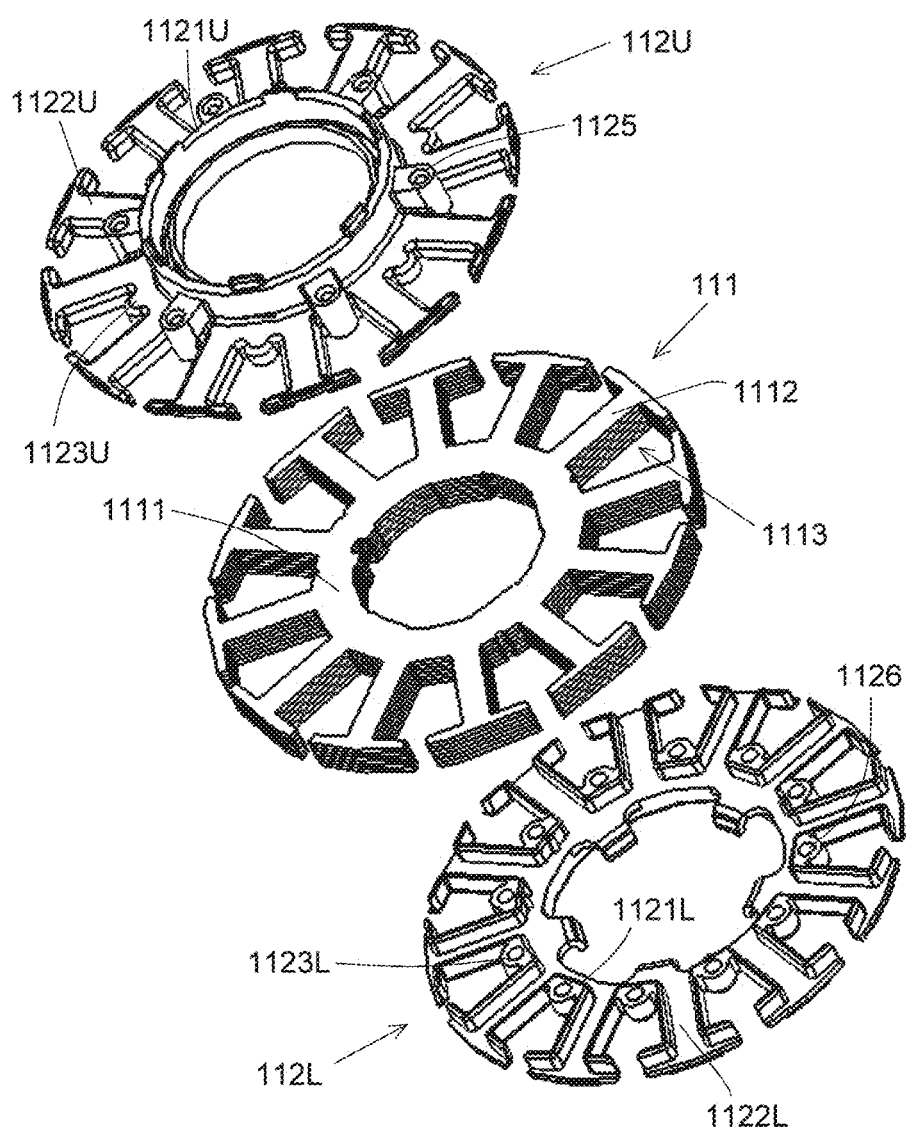
FIG. 4 is an exploded perspective view of the stator illustrated in FIG. 3.
Figure 5:
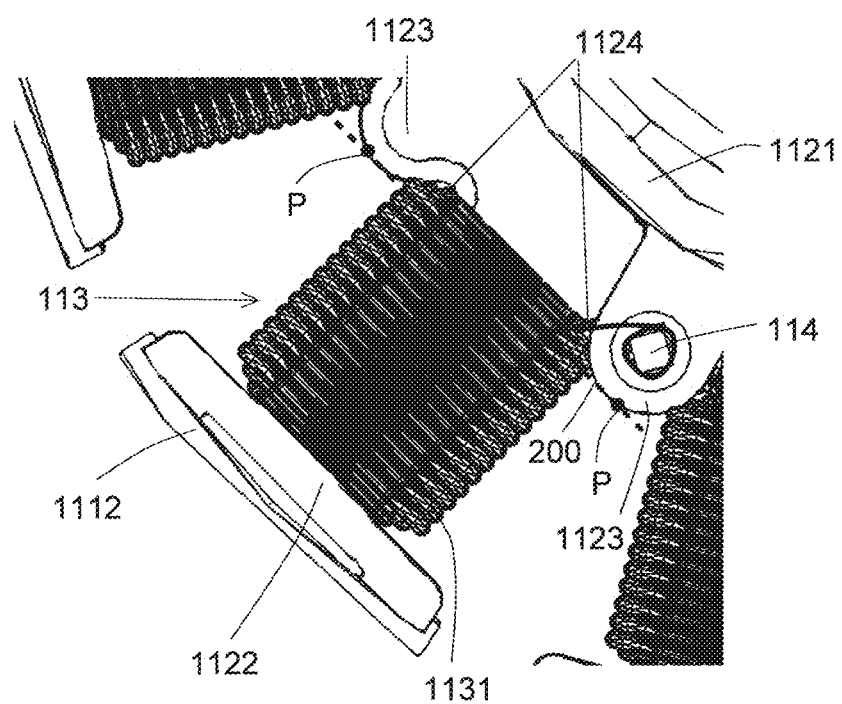
FIG. 5 is an enlarged schematic view of a portion of a stator according to an example embodiment of the present invention.
Figure 7:
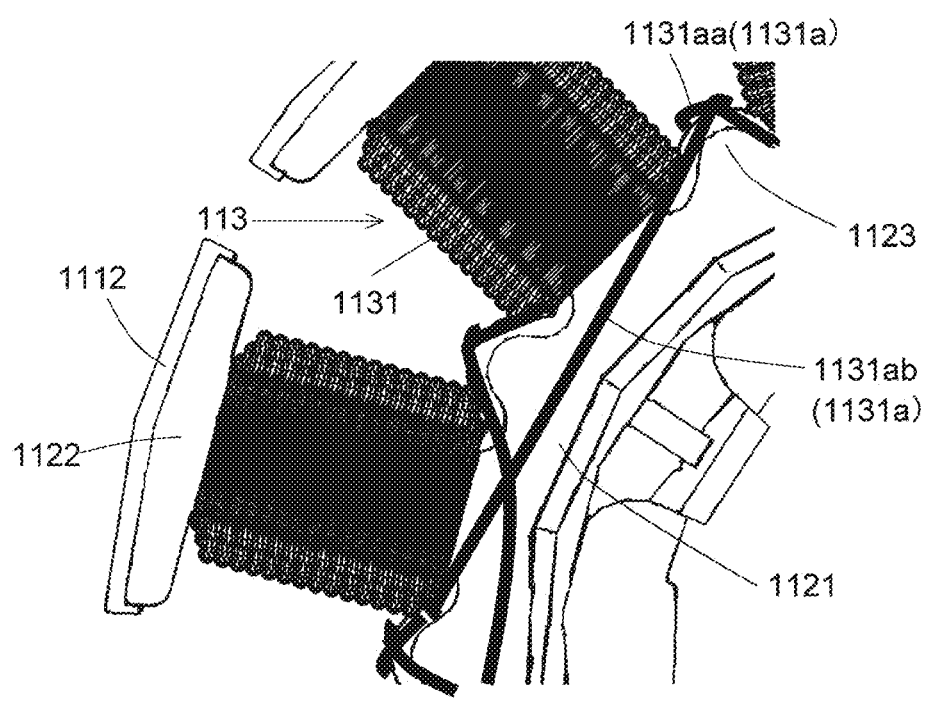
FIG. 7 is an enlarged schematic view illustrating a portion of a stator according to an example embodiment of the present invention.

FIG. 3 is a plan view of the stator 11 according to the example embodiment of the present invention. FIG. 3 is a plan view of the stator 11 as viewed from above in the axial direction. In FIG. 3, a conductive wire 1131 configuring the coil 113 is omitted. Note that, the conductive wire 1131 is illustrated in FIG. 5 or 7 to be described later. FIG. 4 is an exploded perspective view of the stator 11 illustrated in FIG. 3. In FIG. 4, a terminal pin 114 illustrated in FIG. 3 are omitted. The stator 11 is used for the motor 1. As illustrated in FIGS. 2 to 4, the stator 11 includes a stator core 111, an insulator 112, the coil 113, and the terminal pin 114.

The stator core 111 is a magnetic body. The stator core 111 is configured by laminating electromagnetic steel plates, for example. However, the stator core 111 may be configured by joining a plurality of core pieces, for example. The stator core 111 includes an annular core back 1111 and a plurality of teeth 1112. The annular core back 1111 surrounds the central axis C extending vertically. That is, the core back 1111 has an annular shape centered on the central axis C. The teeth 1112 extend radially outward from the core back 1111. The plurality of teeth 1112 are arranged at intervals in the circumferential direction. Specifically, the plurality of teeth 1112 are arranged at equal intervals in the circumferential direction.

In this example embodiment, the number of the slots 1113 provided between adjacent teeth 1112 is five or more. Specifically, the number of the slots 1113 is twelve. The number of the slots 1113 may be less than five. As the number of the teeth 1112 increases, the number of the coils 113 also increases. In this example embodiment, the conductive wire 1131 configuring each coil 113 can be wound around the teeth 1112 with excellent balance.

The insulator 112 covers at least a part of the stator core 111. The insulator 112 is an insulation body and is configured using, for example, a resin. In this example embodiment, as illustrated in FIG. 4, the insulator 112 includes an upper insulator 112U and a lower insulator 112L. The upper insulator 112U is arranged above the stator core 111 in the axial direction. The lower insulator 112L is arranged below the stator core 111 in the axial direction. The upper insulator 112U covers the stator core 111 from above. The lower insulator 112L covers the stator core 111 from below.

The coil 113 is configured by winding the conductive wire 1131 around the teeth 1112 via the insulator 112. The coil 113 is formed on each of the teeth 1112. The number of coils 113 is the same as the number of teeth 1112. In this example embodiment, the number of the teeth 1112 and the coils 113 is twelve. Note that, in this example embodiment, the coils 113 include U-phase coils, V-phase coils, and W-phase coils. That is, the motor 1 having the stator 11 is a three-phase motor.

The terminal pin 114 extends axially upward from the upper surface of the insulator 112. The terminal pin 114 is connected to the end portion of the conductive wire 1131. The end portion of the conductive wire 1131 is wound around, for example, the terminal pin 114. The end portion of the conductive wire 1131 and the terminal pin 114 are electrically connected by, for example, solder. In addition, the terminal pin 114 is electrically connected to the circuit board 3 by, for example, solder. The stator 11 has a plurality of terminal pins 114. In this example embodiment, the number of the terminal pins 114 is six. Specifically, in the coil 113 of each phase of the U phase, the V phase, and the W phase, there are provided the terminal pin 114 around which the winding-start end portion is wound and the terminal pin 114 around which the winding-end end portion is wound. The electrical connection of the coil 113 of each phase is performed on the circuit board 3.

As illustrated in FIG. 3, the insulator 112 has an annular part 1121, a plurality of first protruding parts 1122, and a plurality of second protruding parts 1123.

The annular part 1121 covers at least a part of the core back 1111. The annular part 1121 is centered on the central axis C. Specifically, as illustrated in FIG. 4, the annular part 1121 has an upper annular part 1121U and a lower annular part 1121L. The upper annular part 1121U is provided in the upper insulator 112U. The lower annular part 1121L is provided in the lower insulator 112L. The upper annular part 1121U is arranged above the core back 1111 in the axial direction. The lower annular part 1121L is arranged below the core back 1111 in the axial direction.

The plurality of first protruding parts 1122 cover at least a part of each tooth 1112. The plurality of first protruding parts 1122 protrude radially outward from the annular part 1121. The first protruding part 1122 protrudes radially outward from the outer peripheral edge of the annular part 1121. The first protruding part 1122 is provided for each tooth 1112. That is, the number of the first protruding parts 1122 is the same as that of the teeth 1112. In this example embodiment, the number of the first protruding parts 1122 is twelve. The plurality of first protruding parts 1122 are arranged at equal intervals in the circumferential direction.

Specifically, as illustrated in FIG. 4, the first protruding part 1122 includes an upper first protruding part 1122U and a lower first protruding part 1122L. The upper first protruding part 1122U is provided on the upper insulator 112U. The upper first protruding part 1122U protrudes radially outward from the outer peripheral edge of the upper annular part 1121U. The lower first protruding part 1122L is provided on the lower insulator 112L. The lower first protruding part 1122L protrudes radially outward from the outer peripheral edge of the lower annular part 1121L. The upper first protruding part 1122U is arranged above the teeth 1112 in the axial direction. The lower first protruding part 1122L is arranged below the teeth 1112 in the axial direction.

The plurality of second protruding parts 1123 are provided in respective spaces between the first protruding parts 1122 adjacent in the circumferential direction. That is, the number of the second protruding parts 1123 is the same as that of the first protruding parts 1122. In this example embodiment, the number of the second protruding parts 1123 is twelve. The plurality of second protruding parts 1123 protrude radially outward from the annular part 1121 to be smaller than the first protruding parts 1122. The second protruding part 1123 protrudes radially outward from the outer peripheral edge of the annular part 1121. The length of the plurality of second protruding parts 1123 protruding outward in the radial direction is the same. In plan view from above in the axial direction, the shapes of the radially outer end surfaces of the plurality of second protruding parts 1123 are the same.

Specifically, as illustrated in FIG. 4, the second protruding part 1123 includes an upper second protruding part 1123U and a lower second protruding part 1123L. The upper second protruding part 1123U is provided on the upper insulator 112U. The upper second protruding part 1123U protrudes radially outward from the outer peripheral edge of the upper annular part 1121U. The lower second protruding part 1123L is provided on the lower insulator 112L. The lower second protruding part 1123L protrudes radially outward from the outer peripheral edge of the lower annular part 1121L.

In the stator 11, the terminal pin 114 is provided in a part of the plurality of second protruding parts 1123. In other words, the second protruding part 1123 is present even at a position where the terminal pin 114 is not provided. In this example embodiment, every other of the plurality of second protruding parts 1123 arranged in the circumferential direction is provided with the terminal pin 114 in the circumferential direction. That is, the terminal pin 114 is provided in half of the plurality of second protruding parts 1123. The arrangement of the terminal pins 114 is an example. For example, the arrangement of the terminal pins 114 may be changed according to the number of the terminal pins 114. In addition, for example, the arrangement of the terminal pins 114 may be changed according to the number of the teeth 1112.

According to this example embodiment, the second protruding parts 1123 are provided in respective spaces between the first protruding parts 1122 adjacent in the circumferential direction without depending on whether or not the terminal pins 114 are provided. For this reason, it is possible to suppress that a shape difference occurs on the left and right in the circumferential direction in the coil 113 formed in each first protruding part 1122. That is, in each coil 113, it is possible to suppress the winding of the conductive wire 1131 wound around the teeth 1112 via the first protruding part 1122 from being unbalanced on the left and right in the circumferential direction. As a result, variation in characteristics between the coils 113 can be suppressed, and the quality stability of the stator 11 can be improved.

FIG. 5 is an enlarged schematic view illustrating a part of the stator 11 according to the example embodiment of the present invention. FIG. 5 is a plan view of the stator 11 as viewed from above in the axial direction. FIG. 5 illustrates a virtual line 200 that connects radially outer apexes P of two second protruding parts 1123 adjacent through the first protruding parts 1122. The apex P is a point of the second protruding part 1123 that protrudes most outward in the radial direction from the annular part 1121 in plan view from the axial direction. At least a part of the radially inner end of the coil 113 is arranged radially inward from the virtual line 200 in plan view from the axial direction. In this example embodiment, all of the radially inner ends of the coils 113 are arranged radially inward from the virtual line 200 in plan view from the axial direction.

According to this example embodiment, although the second protruding part 1123 is provided, it is possible to suppress the radial length of the coil 113 from being shortened. That is, according to this example embodiment, although the second protruding part 1123 is provided, it is possible to suppress a decrease in the performance of the stator 11 due to a decrease in the number of turns of the coil 113.

Figure 6:
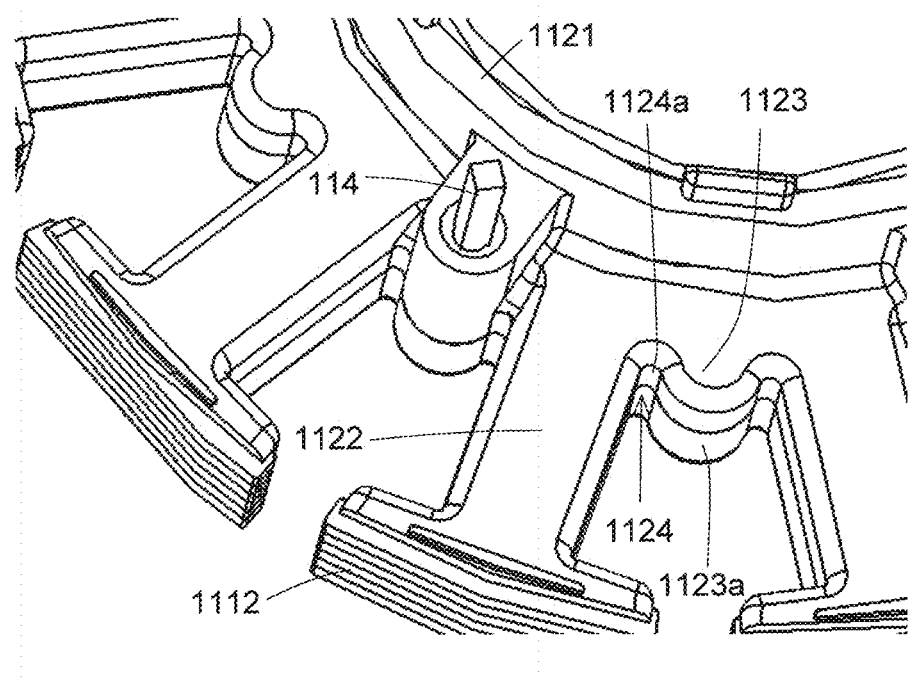
FIG. 6 is an enlarged perspective view illustrating a second protruding portion and a periphery thereof.

FIG. 6 is an enlarged perspective view illustrating the second protruding part 1123 and a periphery thereof. As illustrated in FIGS. 5 and 6, recess parts 1124 that are recessed radially inward from the virtual line 200 are provided in respective spaces between the first protruding parts 1122 and the second protruding parts 1123 in the circumferential direction. In other words, the two recess parts 1124 are provided on the radially inner side of the virtual line 200 connecting the two apexes P. The two recess parts 1124 have the same shape in plan view from the axial direction. At least a part of the radially inner end of the coil 113 is accommodated on the inside of the recess part 1124. In this example embodiment, in the coil 113, the radial inner ends are accommodated on the inside of the recess parts 1124 on the left and right in the circumferential direction. Specifically, the recess part 1124 has a curved surface 1124a which is convex radially inward.

According to this example embodiment, the recess parts 1124 are provided between the first protruding part 1122 and the second protruding parts 1123 on the left and right of the first protruding part 1122 in the circumferential direction. For this reason, although the second protruding part 1123 is provided, it is possible to suppress the radial range in which the conductive wire 1131 in the first protruding part 1122 can be wound from being narrowed. In addition, since the recess part 1124 is curved, the conductive wire 1131 can be wound around the first protruding part 1122 without being damaged.

Note that, in this example embodiment, at least one annular conductive wire 1131 of the coil 113 is in contact with the second protruding part 1123 in the circumferential direction on the radially inner side. The coil 113 is configured by winding a plurality of conductive wires 1131 around the teeth 1112 via the insulator 112. For this reason, the coil 113 is configured by the plurality of annular conductive wires 1131. In the example illustrated in FIG. 5, the plurality of annular conductive wires 1131 are in contact with the second protruding part 1123 in the circumferential direction on the radially inner side of the coil 113. The plurality of annular conductive wires 1131 preferably come into contact with the second protruding part 1123 in the circumferential direction on the left and right in the circumferential direction. According to this example embodiment, the annular conductive wire 1131 configuring the coil 113 can be pressed by the second protruding part 1123, and the irregular winding of the conductive wire 1131 can be suppressed.

As illustrated in FIG. 6, the second protruding part 1123 has a curved outer surface 1123a which is convex radially outward. A portion farthest radially outward from the central axis C of the curved outer surface 1123a configures the apex P described above. In this example embodiment, the curved outer surface 1123a has a circular arc shape. According to this example embodiment, it is possible to suppress a local force from being applied to the conductive wire that comes into contact with the radially outer surface of the second protruding part 1123.

FIG. 7 is an enlarged schematic view illustrating a part of the stator 11 according to the example embodiment of the present invention. FIG. 7 is a plan view of the stator 11 as viewed from below in the axial direction. As illustrated in FIG. 7, the stator 11 has a crossover wire 1131a which is a part of the conductive wire 1131 and is arranged across between the plurality of coils 113. The crossover wire 1131a has a first crossover wire part 1131aa facing the curved outer surface 1123*a* in the radial direction. The first crossover wire part 1131*aa* may not come into contact with the curved outer surface 1123*a*, but preferably comes into contact with the curved outer surface 1123*a*.

In this example embodiment, the radially outer surface of the second protruding part 1123 is the curved outer surface 1123*a*. Thus, even if the first crossover wire part 1131*aa* comes into contact with the radially outer surface of the second protruding part 1123, it is possible to suppress a local force from being applied to the first crossover wire part 1131*aa*. Furthermore, the irregular winding of the conductive wire 1131 wound around the first protruding part 1122 can be suppressed by arranging the first crossover wire part 1131*aa* on the radially outer surface of the second protruding part 1123.

The crossover wire 1131*a* has a second crossover wire part 1131*ab* facing the lower surface of the lower annular part 1121L in the axial direction. The second crossover wire part 1131*ab* may or may not come into contact with the lower surface of the lower annular part 1121L. In this example embodiment, the crossover wire 1131*a* is not arranged on the upper surface of the upper annular part 1121U from which the terminal pin 114 protrudes. The terminal pin 114 is provided on the side where the circuit board 3 is provided. In such a configuration, the blowing device 100 can be made thin compared to the configuration in which the terminal pins 114 are provided on the side opposite to the circuit board 3.

Figure 8:
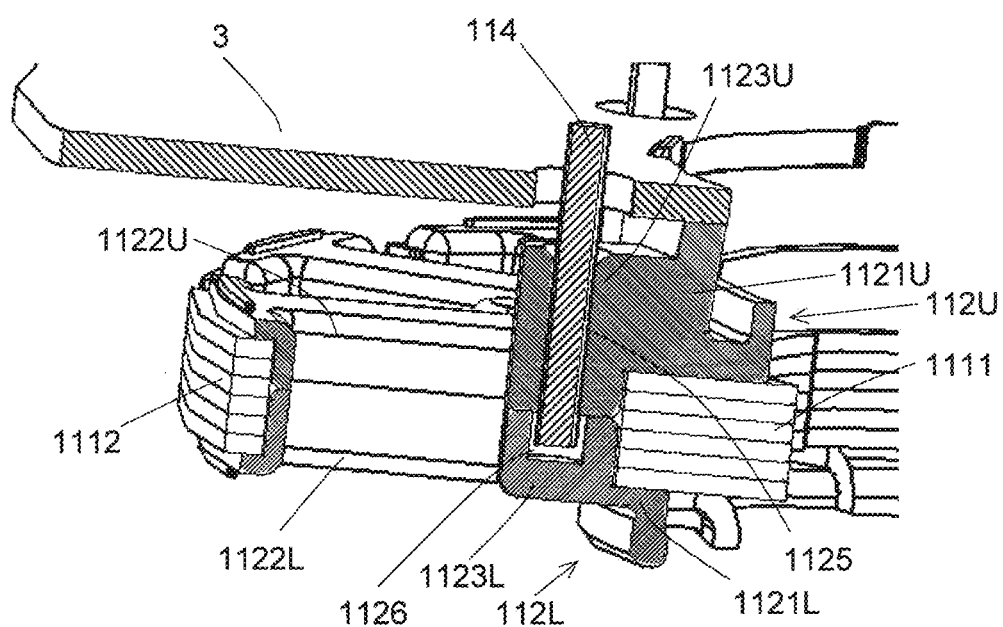
FIG. 8 is an enlarged sectional view of a terminal pin and a periphery thereof.

FIG. 8 is an enlarged sectional view of the terminal pin 114 and a periphery thereof. As illustrated in FIGS. 4 and 8, a part of the plurality of upper second protruding parts 1123U is provided with a pin hole 1125 that penetrates in the axial direction and into which the terminal pin 114 is inserted. In this example embodiment, among the twelve upper second protruding parts 1123U, the six upper second protruding parts 1123U are provided with pin holes 1125. The pin hole 1125 has a circular shape in plan view from the axial direction. However, the pin hole 1125 may have a shape other than the circular shape.

Note that, a through hole penetrating in the axial direction may also be provided in the upper second protruding part 1123U into which the terminal pin 114 is not inserted. However, it is preferable that a through hole penetrating in the axial direction is not provided in the upper second protruding part 1123U into which the terminal pin 114 is not inserted. Accordingly, the position where the terminal pin 114 is attached can be quickly recognized.

In this example embodiment, the second protruding part 1123 provided with the terminal pin 114 is provided to have a large axial thickness compared to the second protruding part 1123 in which the terminal pin 114 is not provided. Specifically, the upper second protruding part 1123U provided with the pin hole 1125 for inserting the terminal pin 114 is provided to have a large axial thickness compared to the upper second protruding part 1123U in which the pin hole 1125 is not provided. The terminal pin 114 can be firmly fixed by increasing the axial thickness of the second protruding part 1123 provided with the terminal pin 114. By reducing the axial thickness of the second protruding part 1123 in which the terminal pin 114 is not provided, the amount of resin used for manufacturing the insulator 112 can be reduced. However, the axial thickness of the second protruding part 1123 in which the terminal pin 114 is not provided may be the same as the axial thickness of the second protruding part 1123 in which the terminal pin 114 is provided. All the second protruding parts 1123 may have the same shape without depending on whether or not the terminal pin 114 is inserted.

As illustrated in FIGS. 4 and 8, a part of the plurality of lower second protruding parts 1123L is provided with an axial recess part 1126 that overlaps the pin hole 1125 in the axial direction and is recessed in the axial direction. The axial recess part 1126 is provided to face the pin hole 1125. For this reason, in this example embodiment, among the twelve lower second protruding parts 1123L, six lower second protruding parts 1123L are provided with the axial recess parts 1126. The axial recess part 1126 has a circular shape in plan view from the axial direction. However, the shape of the axial recess part 1126 may be a shape other than the circular shape. The terminal pin 114 inserted into the pin hole 1125 may be inserted into the axial recess part 1126 or may not be inserted. However, the terminal pin 114 is preferably inserted into the axial recess part 1126. Accordingly, the terminal pin 114 can be firmly held, and the axial thickness of the stator 11 can be suppressed from becoming unnecessarily thick.

Note that, in this example embodiment, a recess part that is recessed in the axial direction is also provided in the lower second protruding part 1123L that axially overlaps the upper second protruding part 1123U in which the pin hole 1125 is not provided. The recess part may not be provided. In addition, a through hole penetrating in the axial direction may be provided instead of the axial recess part 1126.

In this example embodiment, the lower second protruding part 1123L is provided with the axial recess part 1126 instead of the through hole penetrating in the axial direction. For this reason, the terminal pin 114 inserted into the pin hole 1125 can be prevented from protruding from the lower surface of the lower insulator 112L. That is, the terminal pin 114 can be prevented from coming into contact with the second crossover wire part 1131*ab* arranged on the lower surface side of the insulator 112. In addition, according to this example embodiment, even in a case where a scrap is generated when the terminal pin 114 is inserted into the insulator 112, the scrap can be retained in the axial recess part 1126.

The present invention can be widely used in, for example, a stator used in an outer rotor type motor. The present invention can be used, for example, in a centrifugal fan or the like provided to send wind into a vehicle seat.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A stator for use in a motor, the stator comprising:
a stator core including a core back having an annular shape and surrounding a central axis extending vertically and a plurality of teeth extending radially outward from the core back;
an insulator covering at least a portion of the stator core; and
a coil defined by a conductive wire wound around the teeth via the insulator; and
a terminal pin which extends axially upward from an upper surface of the insulator and is connected to an end portion of the conductive wire; wherein
the insulator includes:
an annular portion which covers at least a portion of the core back and is centered on the central axis;

a plurality of first protruding portions which cover at least a portion of each of the teeth and protrude radially outward from the annular portion; and a plurality of second protruding portions which are provided in respective spaces between all circumferentially opposing ones of the first protruding portions about an entire circumference of the stator core and which protrude radially outward from the annular portion to be smaller than the first protruding portions;

the terminal pin is provided in a portion of the plurality of second protruding portions;

at least a portion of a radially inner end of the coil is radially inward compared to a virtual line that connects radially outward apexes of two of the second protruding portions adjacent a first protruding portion in plan view from an axial direction;

recess portions, which are recessed radially inward from the virtual line, are defined in radially outermost surfaces of the insulator in respective spaces between all opposing ones of the first protruding portions and the second protruding portions in a circumferential direction, the recess portions being curved radially inward from portions of the first protruding portions and the second protruding portions which are directly circumferentially adjacent to the recess portions; and at least a portion of the radially inner end of the coil is accommodated on an inside of at least one of the recess portions.

2. The stator according to claim 1, wherein the second protruding portions include a curved outer surface which is convex radially outward.

3. The stator according to claim 2, comprising:
a crossover wire which is a portion of the conductive wire and crosses between a plurality of the coils; wherein
the crossover wire includes a first crossover wire portion radially facing the curved outer surface.

4. The stator according to claim 1, wherein at least one conductive wire having an annular coil shape is in contact with the second protruding portions in the circumferential direction on a radially inner side.

5. The stator according to claim 1, wherein
the insulator includes:
an upper insulator above the stator core in the axial direction; and
a lower insulator below the stator core in the axial direction;
the second protruding portions include:
upper second protruding portions provided in the upper insulator; and
lower second protruding portions provided in the lower insulator;
a portion of the upper second protruding portions is provided with a pin hole that penetrates in the axial direction and into which the terminal pin is inserted; and
a portion of the lower second protruding portions is provided with an axial recess portion that overlaps the pin hole in the axial direction and is recessed downward in the axial direction.

6. The stator according to claim 5, wherein
the annular portion includes:
an upper annular portion provided in the upper insulator; and
a lower annular portion provided in the lower insulator;
the stator further comprising:
a crossover wire that is a portion of the conductive wire and crosses between a plurality of the coils;
the crossover wire includes a second crossover wire portion opposing a lower surface of the lower annular portion in the axial direction.

7. The stator according to claim 1, wherein a number of slots provided between the adjacent teeth is five or more.

8. A motor comprising:
the stator according to claim 1; and
a rotor including a magnet opposing the stator in a radial direction.

9. A blowing device comprising:
the motor according to claim 8; and
an impeller rotatable with the rotor.

* * * * *